United States Patent [19]

Takehara

[11] Patent Number: 5,270,602
[45] Date of Patent: Dec. 14, 1993

[54] CORLESS MOTOR

[75] Inventor: Isamu Takehara, Tokyo, Japan

[73] Assignee: Seiko Instruments Inc., Japan

[21] Appl. No.: 911,508

[22] Filed: Jul. 10, 1992

[30] Foreign Application Priority Data

Jul. 16, 1991 [JP] Japan .................. 3-175627

[51] Int. Cl.$^5$ .............................................. H02K 3/00
[52] U.S. Cl. .................................. 310/198; 310/154; 310/207; 310/266
[58] Field of Search ............... 310/184, 198, 203, 204, 310/205, 207, 266, 202, 208, 154, 233

[56] References Cited

U.S. PATENT DOCUMENTS

| | | | |
|---|---|---|---|
| 2,414,571 | 1/1947 | Veinott | 310/198 |
| 3,949,254 | 4/1976 | Woll | 310/198 |
| 4,200,817 | 4/1980 | Bratoljic | 310/198 |
| 4,370,581 | 1/1983 | Nakamura | 310/198 |
| 4,887,020 | 12/1989 | Graham | 310/198 |
| 4,914,335 | 4/1990 | Horton | 310/207 |
| 5,017,822 | 5/1991 | Shimizu | 310/207 |

FOREIGN PATENT DOCUMENTS 2260214  8/1975  France .................. 310/198

Primary Examiner—R. Skudy
Attorney, Agent, or Firm—Bruce L. Adams; Van C. Wilks

[57] ABSTRACT

A coreless motor has a permanent magnet integrated with a casing, a commutator, and a rotor coil unit integrated with an output shaft. The rotor coil unit is comprised of an integral number of coil blocks superposed with one another. Respective coil blocks have a displacement angle of $X_M = 360 \times M/n$ degrees relative to a reference coil block, wherein $X_M$ denotes the displacement angle of the Mth coil block removed from the reference block, M denotes a positive integer from 1 to $n-1$ (the Mth coil block removed from the reference block), and n represents the number of coil blocks and is an odd integer having a value of 3 or more. Each coil block shares a center angle of $X_2 + 360/p$ degrees, wherein $X_2$ denotes the displacement angle of the second coil block removed from the reference block, and p denotes the number of poles of the permanent magnet. The coil blocks are connected in series to form respective phases of the rotor coil blocks such that the rotor coil blocks of each phase can pass an electric current in the same direction. By this construction, the coreless motor has an odd number of coil blocks superposed with one another at a predetermined shift angle, and, as a result, the coreless motor can produce a higher output torque through a series connection of coils and has a reduced number of junction nodes as compared to a motor utilizing a parallel connection.

10 Claims, 11 Drawing Sheets

FIG. 14
PRIOR ART
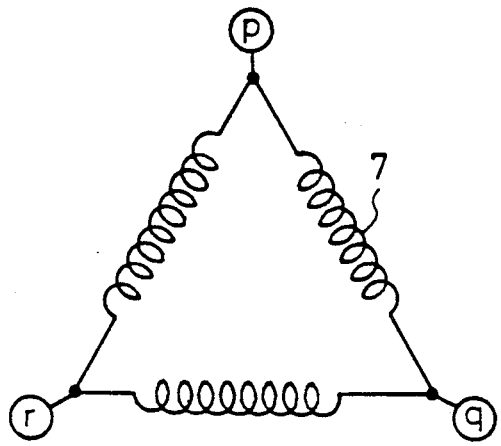
FIG. 16
PRIOR ART
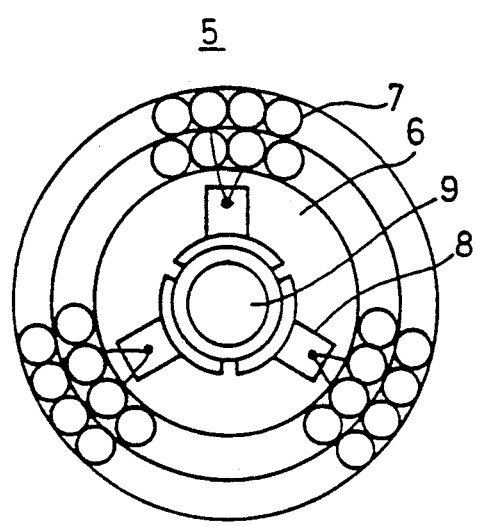
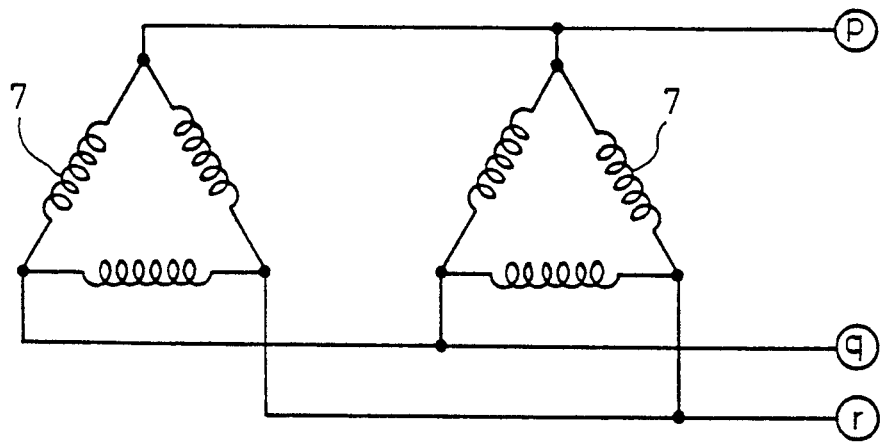
FIG. 15
PRIOR ART

CORELESS MOTOR

BACKGROUND OF THE INVENTION

The present invention relates to a coreless motor having a permanent magnet fixed to a casing and formed with an even number of poles, a rotor coil unit integrated with an output shaft, and a commutator.

There has been known the conventional coreless motor of the cylindrical type used in an office automation instrument, a robot, a medical instrument and so on, which requires a high performance motor featuring a high efficiency as well as a quick start/stop motion.

FIG. 10 is a structural diagram of the prior art motor. In a manner similar to other types of motors, there is included a rotor 5 and a stator composed of a magnet 4. The rotor 5 includes a rotor coil unit 7 which solely contributes to generation of output torque. The motor further comprises a rotor holder 6 which supports the coil unit, a commutator mechanism composed of commutator segments 8 for controlling rotation direction, and an output shaft 9 for rotatably supporting the rotor. The stator is constructed such that a bearing housing 2 having bearings 3 contains therein the fixed magnet 4. A casing 1 is fixed to the bearing housing 2 to cover entirely the same, while the casing 1 functions as a return yoke of the magnet 4. An electric current is fed to the rotor coil unit 7 of the rotor 5 via lead wires 12, contacts of a brush 10 and respective commutator segments 8. A pair of washers 13 are disposed on outer faces of the respective bearings 3, and a stopper ring 14 is fixed to the output shaft 9 in order to suppress an axial movement of the rotor 5 during the course of rotation. A cap 15 is fixed to an inner portion of a rear cover 11 to block an exterior dust.

The conventional coreless motor has a winding structure shown in FIGS. 11, 12 and 13. The rotor coil unit 7 of the coreless motor is connected electrically as shown in FIG. 14 to form the rotor 5 as shown in FIG. 16. As understood from FIG. 16, this coreless winding is formed such that the coil unit 7 of the rotor 5 has a radial thickness defined by two layers of the windings. However, since the radial thickness is limited to twice the diameter of the coil wire, the conventional structure has the drawback that the coil wires cannot freely be wound thick, thereby limiting the amount of copper in the coil unit.

Particularly in reducing the motor size, while an energy product of the magnet has been improved efficiently, a magnetomotive force of the coil of the rotor has not been improved efficiently. Stated otherwise, in reducing the motor size, the magnetic loading has been improved while the electric loading has not been improved. The motor output torque cannot be optimally improved unless a design balance is ensured with respect to a ratio between the magnetic loading and the electric loading. In view of this, it is necessary to optimally broaden a space gap between the magnet and the casing so as to increase the amount of copper in the rotor coil unit. In order to increase the copper amount of the coreless coil, it is necessary to increase a radial thickness of the cylindrical coil unit.

It might be advisable to form multiple stages of the cylindrical coil units. However, for example, when respective stages of the coil units are connected in parallel to each other as shown in FIG. 15, drawback that an inductive voltage coefficient Ke cannot be raised in the reduced motor. There is a problem that a series connection is needed in order to increase a value of Ke in the prior art.

SUMMARY OF THE INVENTION

Accordingly, in order to solve the above-mentioned problem associated with prior art, an object of the invention is to provide a coreless motor having a series connection structure featuring a high output torque. According to the invention, in the coreless motor having a permanent magnet integrated with a casing and formed with an even number of poles, a rotor coil unit integrated with an output shaft, and commutator segments, the rotor coil unit is comprised of an integer number n of coil blocks superposed with one another such that each coil block has a pair of side edge portions sharing a center angle or an angle interval of $(X_2 + 360/P)$ degree so that respective one of the coil blocks have a shift angle $X_M = 360 \times M/n$ degrees relative to a reference coil block, where M denotes a positive integer of from "1" to "n−1" and represents the Mth coil block relative to a reference coil block, n denotes an odd number greater than or equal to "3", and P denotes a number of poles of the permanent magnet.

In the coreless motor constructed as described above, when a given voltage is applied to an input terminal of the rotor coil unit, an electric current flows through each phase of the coil blocks of the rotor coil unit in the same direction. Consequently, the output shaft of the coreless motor rotates due to a magnetic force of the permanent magnet and a magnetomotive force of the rotor coil unit.

BRIEF DESCRIPTION OF THE DRAWINGS

FIG. 14 is a schematic connection diagram of a coil in the conventional coreless motor.

FIG. 15 is a schematic parallel connection diagram of a coil in the conventional coreless motor.

FIG. 16 is a diagram showing a coil of the conventional coreless motor, viewed from a motor output shaft.

DETAILED DESCRIPTION OF THE INVENTION

Figure 1:
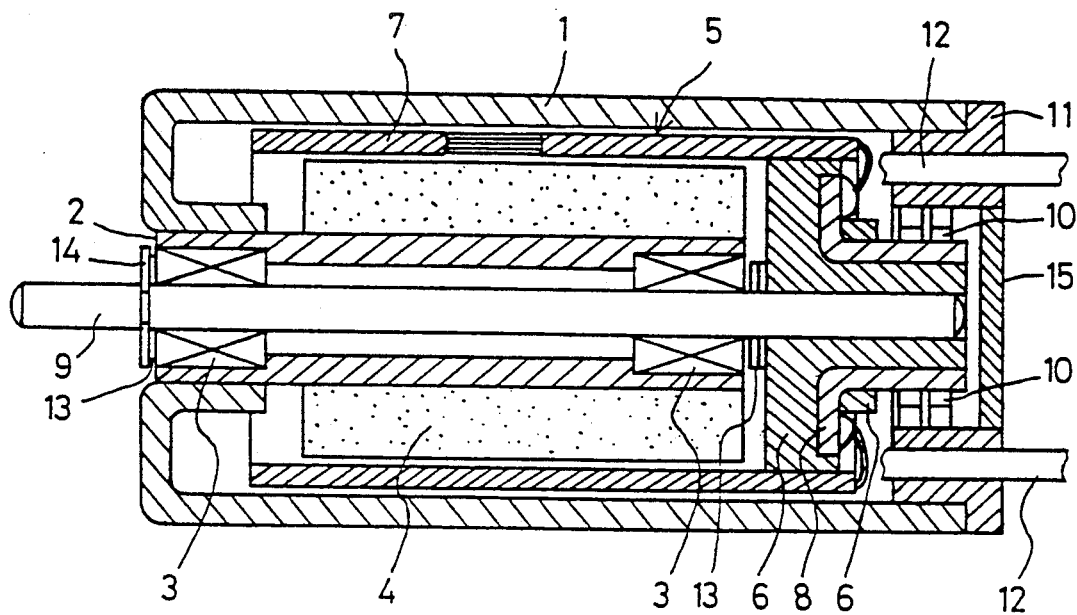
FIG. 1 is a structural diagram of the inventive coreless motor.

Hereinafter, embodiments of the present invention will be described in conjunction with the drawings. Referring to FIG. 1, the invention coreless motor has a magnet 4, a bearing housing 2, bearings 3 and a casing 1, constructed in a similar manner as the conventional coreless motor. Further, there are provided a rotor coil unit 7, a holder 6 for supporting the coil unit 7, an output shaft 9, commutator segments 8, brushes 10, a rear cover 11 and lead wires 12.

The inventive coreless motor is different from the conventional coreless motor, substantially in the winding and connecting structure of the rotor coil unit 7. The first embodiment of the rotor coil unit is shown in FIGS. 2–6 according to the invention. FIG. 3 is a basic circuit diagram showing a delta connection of the first embodiment according to the invention. A pair of coils 31 and 32 are connected in series to each other between terminals or taps p and q. Another pair of coils 33 and 34 are connected between terminals or taps q and r. A further pair of coils 35 and 36 are connected between terminals or taps r and p. The coils 31–36 are arranged to constitute the rotor coil unit 7 of FIG. 1.

Figure 8:
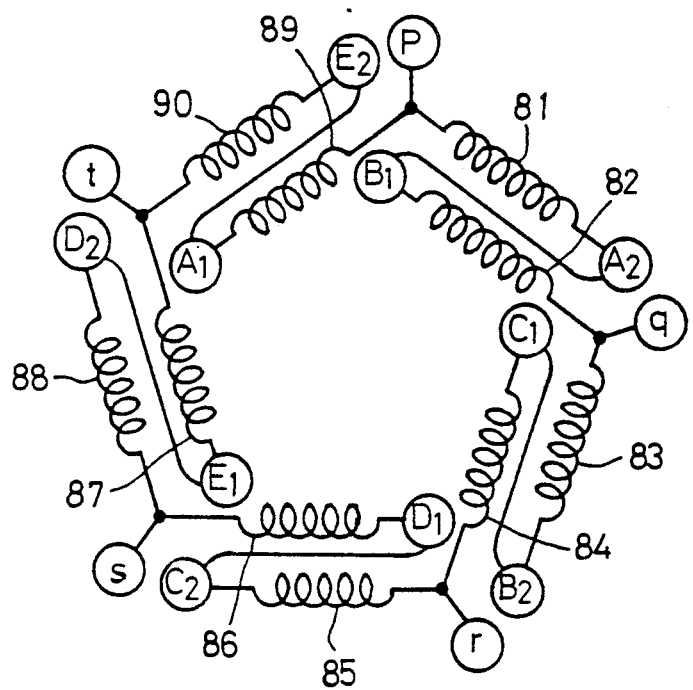
FIG. 8 is a schematic diagram of a rotor coil unit in the second embodiment of the inventive coreless motor.

FIG. 8 is a basic coil arrangement diagram of the first embodiment of the rotor coil unit 7 according to the invention. The coils 31 and 32 are overlapped with one another between the terminals p and q through intermediate nodes $A_2$ and $B_1$. The coils 33 and 34 are overlapped with one another between the terminals q and r through intermediate nodes $B_2$ and $C_1$. The coils 35 and 36 are overlapped with one another between the terminals r and p through intermediate nodes $C_2$ and $A_1$. In this configuration, the nodes $B_1$ and $C_2$ are arranged adjacently to the terminal or intermediate tap p, the nodes $A_2$ and $C_1$ are disposed adjacently to the terminal q, and the nodes $B_2$ and $A_1$ are positioned adjacently to the terminal r.

Figure 4:
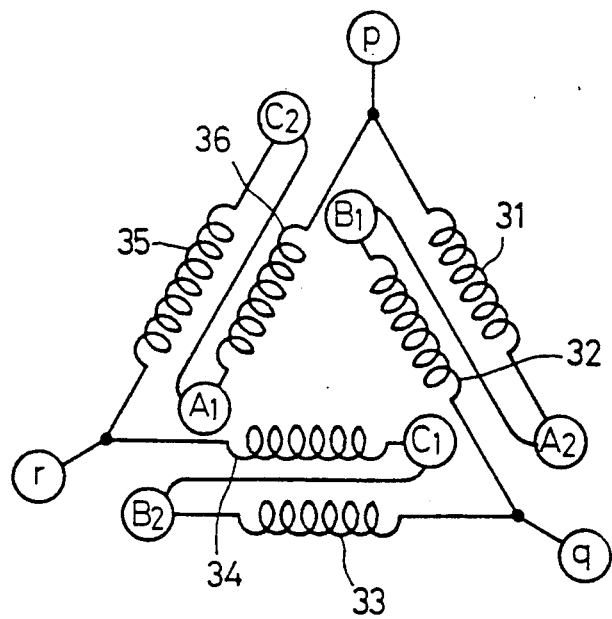
FIG. 4 is a schematic diagram of a rotor coil unit in the first embodiment of the coreless motor according to the invention.

Next, the description is given for the operation of the first embodiment of the invention. Referring to FIG. 4, the terminal p is applied with a positive potential and terminal q is applied with a negative potential at a given moment, while the remaining terminal r is turned off. An electric current flows through the coils 31 and 32 such that respective electric current flow in the same direction. Consequently, the coils 51 and 52 components of coils 31 and 32 can generate a magnetic field in the same direction. In a similar manner, the pair of coils 33 and 34, and the other pair of coils 35 and 36 may generate a magnetic field in the same direction, respectively. The output shaft 9 of the coreless motor rotates due to interaction between the magnetic fields of the coils 31–36 and the magnetic field of the magnet 4.

The terminal r is then applied with a positive potential and terminal q is applied with a negative potential, while the remaining terminal p is turned off. An electric current flows through the coils 33 and the coil 34 in the same direction. In a similar manner the pair of coils 35 and 36, and the other pair of coils 31 and 32 can generate a magnetic field in the same direction, respectively. The output shaft 9 of the coreless motor rotates according to the magnetic fields of the coils 31–36 and the magnetic field of the magnet 4. Thereafter, in a similar manner, the polarity of voltages applied to the respective terminals is switched sequentially to continue the rotation of the output shaft 9 of the coreless motor.

Figure 5:
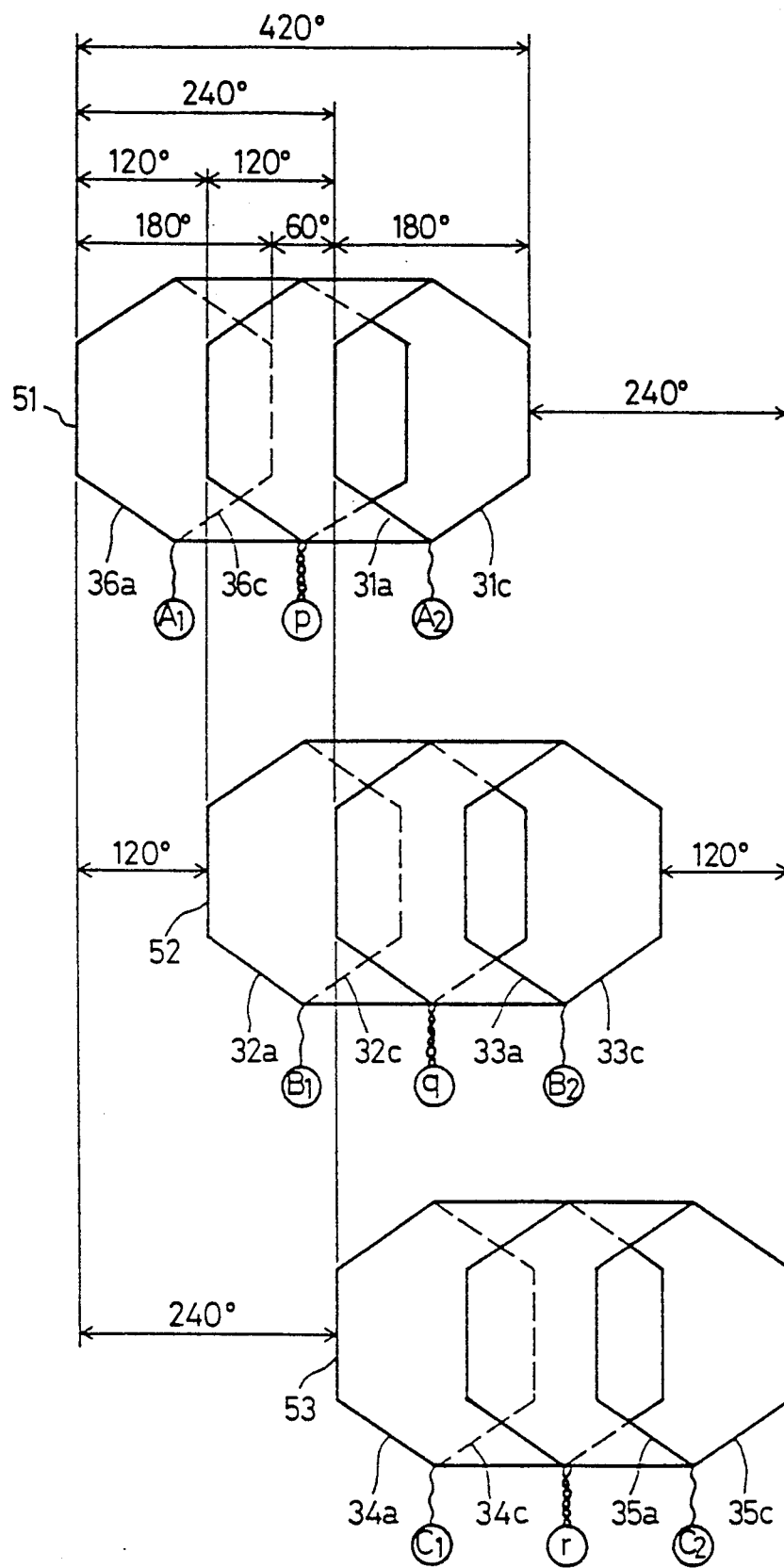
FIG. 5 is a coil arrangement diagram of the first embodiment of the coreless motor according to the invention.

FIG. 5 is a coil block arrangement diagram of the first embodiment according to the invention. A coil block 51 is formed of hexagonal coils which are wound from a start node $A_1$ (which is intermediate node $A_2$). The coils are wound spirally and sequentially in the rightward direction when the figure is viewed from the front side. A front coil 36a and a rear coil 36c are disposed is opposed relation and are arranged from the winding start node $A_1$ to the intermediate tap p. Next, a front coil 31a and a rear coil 31c are disposed in opposed relation and are arranged from the intermediate tap p to the winding end node $A_2$ (which is intermediate node $A_2$). A coil pitch of the hexagonal configuration, i.e., a pitch interval from the winding start node $A_1$ to the intermediate tap p is set to 120 degrees in terms of a mechanical angle which is defined as an angular pitch between side lines of adjacent hexagonal configurations.

Similarly, a pitch interval is set to 120 degrees in terms of the mechanical angle between the intermediate tap p and the winding end node $A_2$. A closed circuit composed of a single loop of the coil wound spirally has a coil pitch interval which is set substantially identical to a magnetic pole pitch interval of the magnet 4 (which has two poles in this embodiment). Namely, the coil pitch interval is set to 180 degrees in this embodiment. The mechanical angle is set to 180 degrees between the leading side line of the front coil 36a and the side line of the rear coil 36c. Though this value of 180 degrees is a whole node pitch on the design configuration, the mechanical angle may be set higher or lower than 180 degrees according to design choice. The coil block 51 has the entire pitch interval of 420 degrees in terms of the mechanical angle.

In a manner similar to the first coil block 51, the coil block 52 includes a front or top coil 32a and a rear or back coil 32c disposed in opposite faces between the winding start node $B_1$ (intermediate node $B_1$) and the intermediate tap q. Further, a front coil 33a and a rear coil 33c are disposed in superposed relation between the intermediate tap q and the winding end node $B_2$ (intermediate node $B_2$). The coil block 52 has a certain mechanical angle, between side lines thereof, set similarly as the coil block 51. The coil block 52 is shifted or displaced from the coil block 51 by 120 degree in terms of the mechanical angle. In a manner similar to the first coil block 51, the third coil block 53 has a front coil 34a and a rear coil 34c which are overlapped with each other between the winding start node $C_1$ (intermediate node $C_1$) and the intermediate tap r. Further, a front coil 35a and a rear coil 35c are opposed to one another between the intermediate tap r and the winding end node $C_2$ (intermediate node $C_2$). The coil block 53 has a certain mechanical angle, between separate side lines, set similarly as the first coil block 51. The coil block 53 is displaced from the first coil block 51 by 240 degrees in terms of the mechanical angle.

Figure 6:
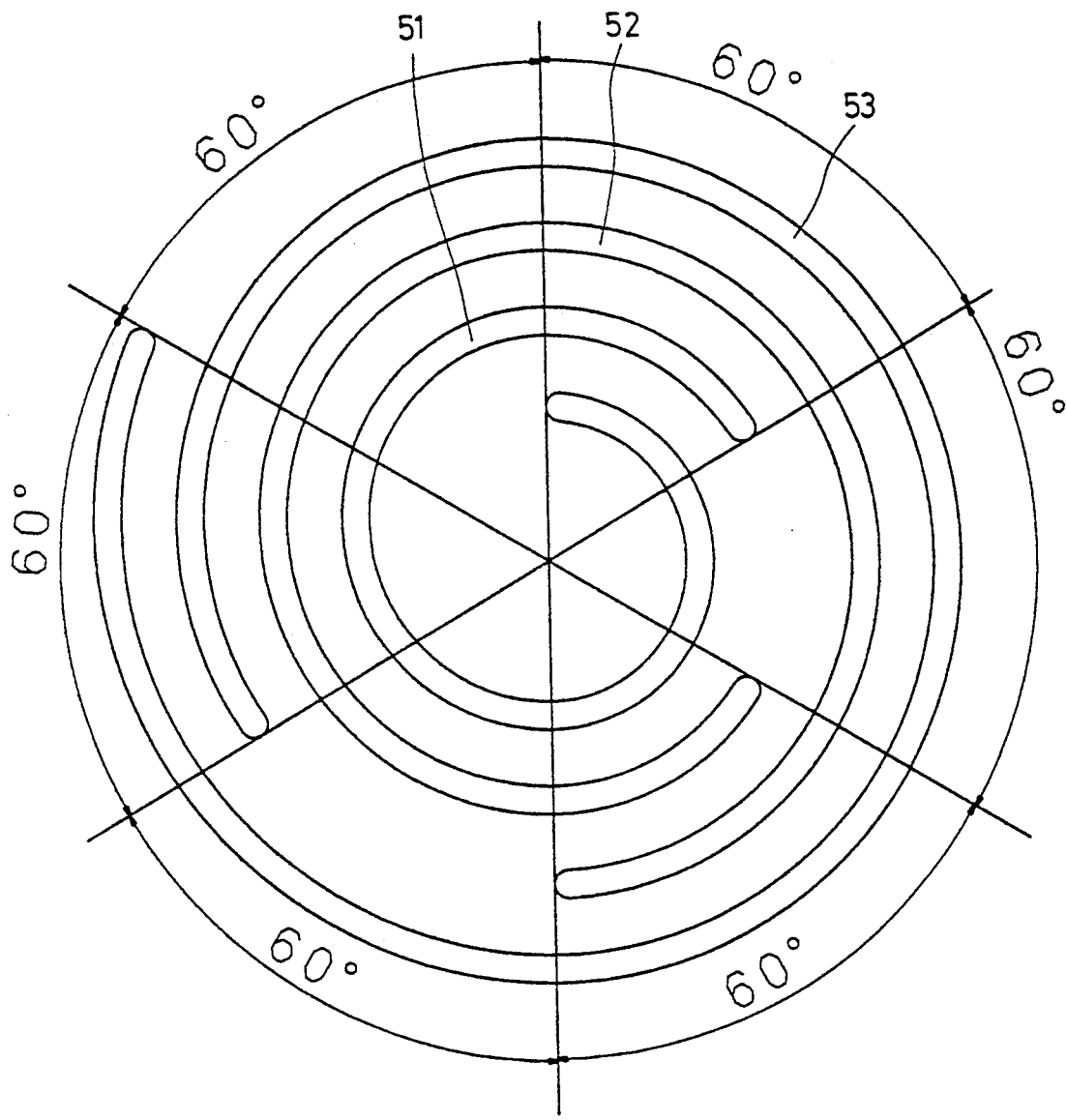
FIG. 6 is a diagram showing a laminate structure of the coil block in the first embodiment of the coreless motor according to the invention, observed from a motor output shaft.

FIG. 6 is a schematic sectional view of the overlapping structure of the coil blocks 51, 52 and 53, observed from an axial direction of the motor output shaft. The winding start portion and winding end portion of each coil block overlap with one another by 60 degrees, because each block has an entire pitch interval of 420 degrees in terms of the mechanical angle.

Figure 2:
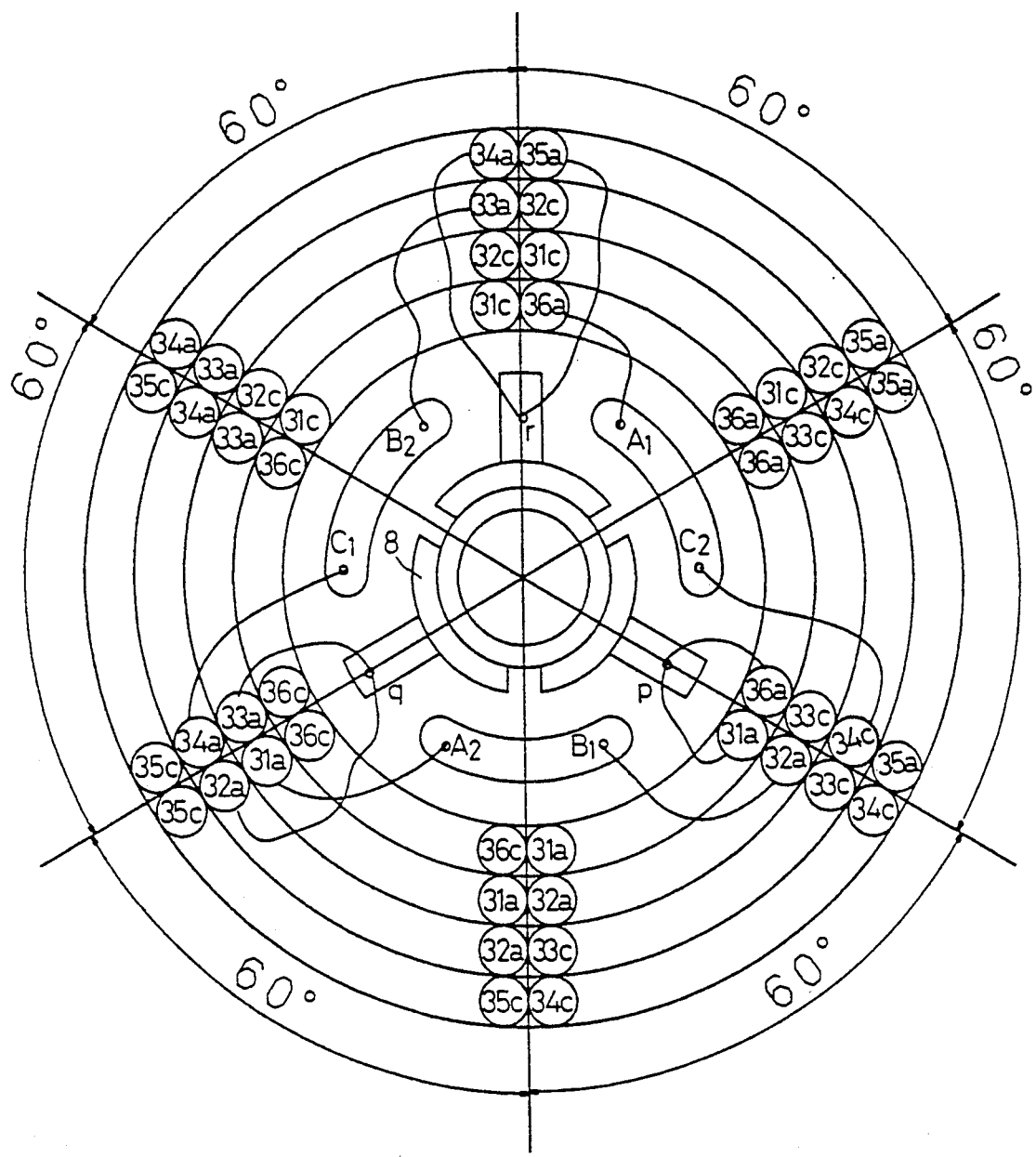
FIG. 2 is a connection diagram of the first embodiment of the coreless motor according to the invention.
Figure 3:
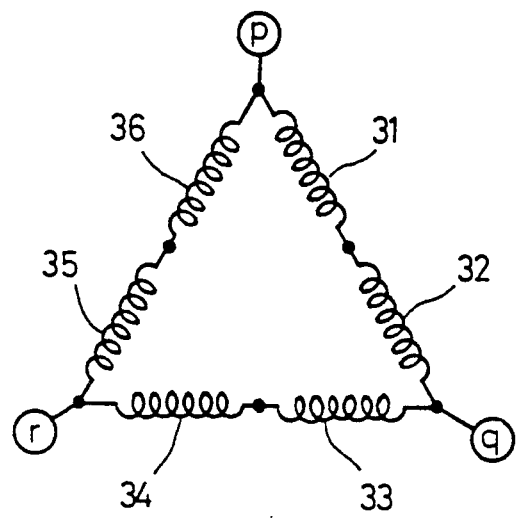
FIG. 3 is a basic connection diagram of the first embodiment of the coreless motor according to the invention.

FIG. 2 is a schematic lead pattern diagram showing an electrical connection among the coils 31-36, the junction nodes or pad patterns $A_1/C_2$, $B_1/A_2$ and $C_1/B_2$, and the terminals or taps p, q and r of the commutator segments 8. In the present embodiment, the coils 31-36 are superposed with one another in four layers throughout the entire length of a circle.

FIG. 8 is a schematic diagram showing a rotor coil unit 7 of the second embodiment according to the invention. A pair of coils 81 and 82 are overlapped with each other between terminals p and q through intermediate nodes $A_2$ and $B_1$. A pair of coils 83 and 84 are overlapped with each other between terminals q and r through intermediate nodes $B_2$ and $C_1$. A pair of coils 85 and 86 are overlapped with each other between terminals r and s through intermediate nodes $C_2$ and $D_1$. A pair of coils 87 and 88 are overlapped with each other between terminals s and t through intermediate nodes $D_2$ and $E_1$. A pair of coils 89 and 90 are overlapped with each other between terminals t and p through intermediate nodes $E_2$ and $A_1$. In this configuration, the nodes $B_1$ and $E_2$ are adjacent to the terminal p, the nodes $A_2$ and $C_1$ are adjacent to the terminal q, the nodes $B_2$ and $D_1$ are adjacent to the terminal r, the nodes $E_1$ and $C_2$ are adjacent to the terminal s, and the nodes $A_1$ and $D_2$ are adjacent to the terminal t.

A description is given for the operation of the second embodiment according to the invention with reference to FIG. 8. At a given moment, the terminal p is applied with a positive potential and the terminal r is applied with a negative potential. The remaining terminals q, s and t are turned off. At this moment, the coils 81 and 82, or the coils 83 and 84 can generate a magnetic field in the same direction, respectively. In a similar manner, the respective pairs of coils 89 and 90, coils 87 and 88, and coils 85 and 86 can generate a magnetic field in the same direction. The output shaft 9 of the coreless motor rotates according to the interaction between magnetic fields of the coils 81-90 and the magnetic field of the magnet 4. At a next step, the terminal t is applied with a positive potential and the terminal r is applied with negative potential, while the remaining terminals p, q and s are turned off. Thereafter in a similar manner, a voltage is applied to the respective terminals while sequentially switching the polarity of the applied voltage, thereby rotating the output shaft 9 of the coreless motor.

Figure 9:
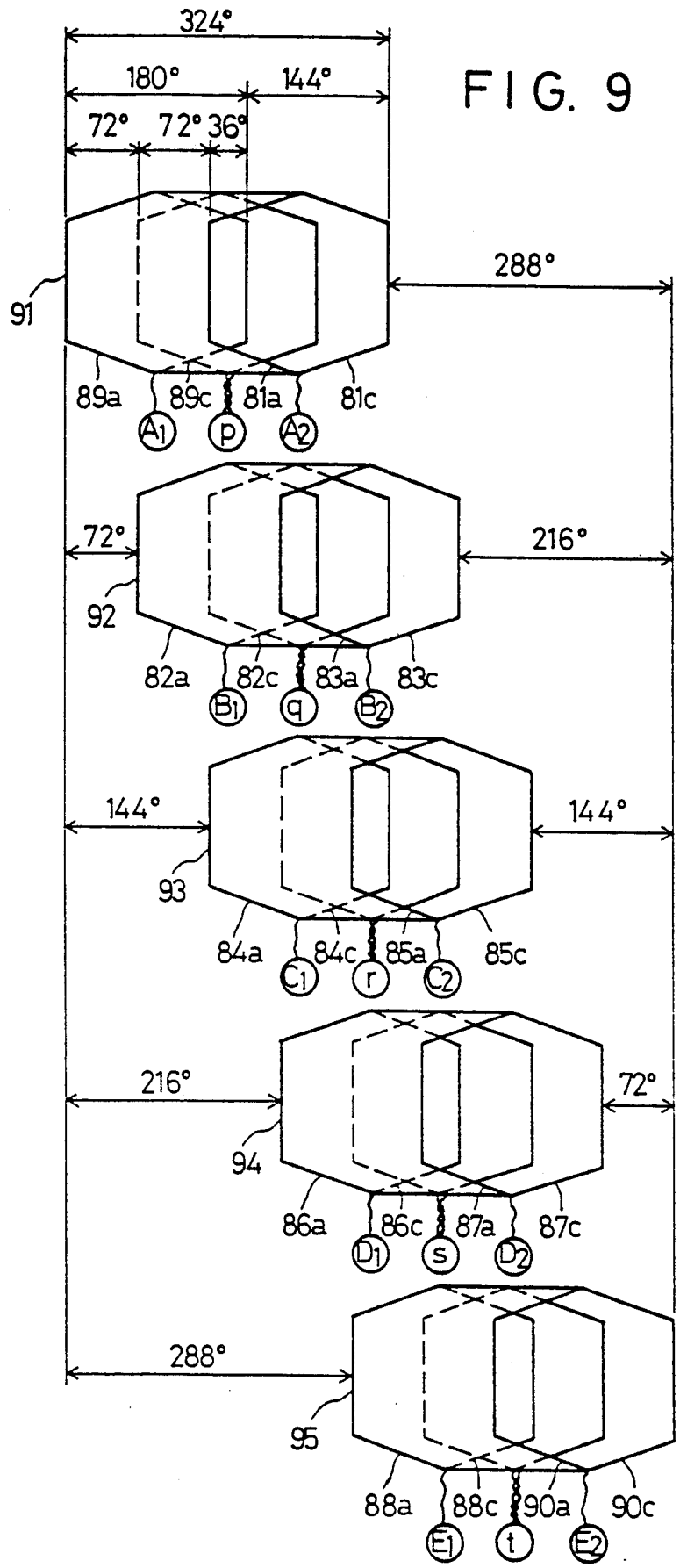
FIG. 9 is a coil arrangement diagram of the second embodiment of the inventive coreless motor.
Figure 10:
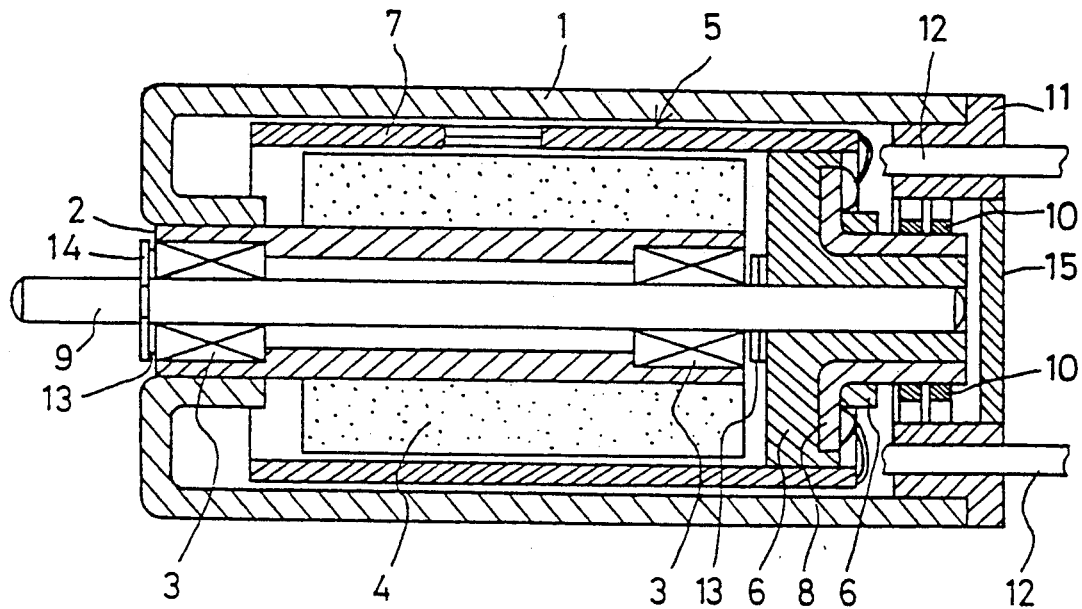
FIG. 10 is a structural diagram of the conventional coreless motor.
Figure 11:
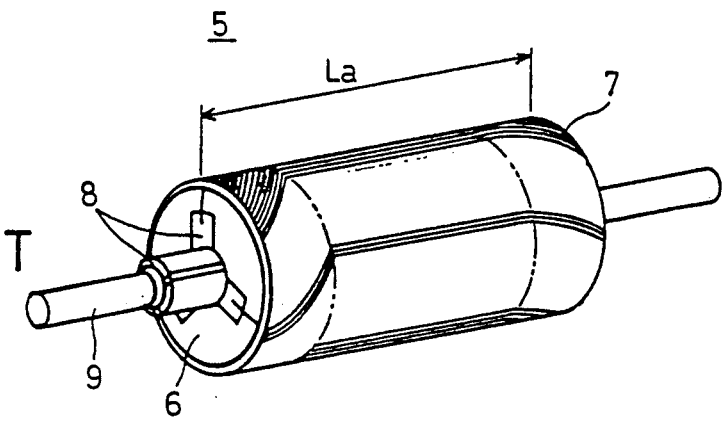
FIG. 11 is a perspective view of a rotor coil unit in the conventional coreless motor.
Figure 12:
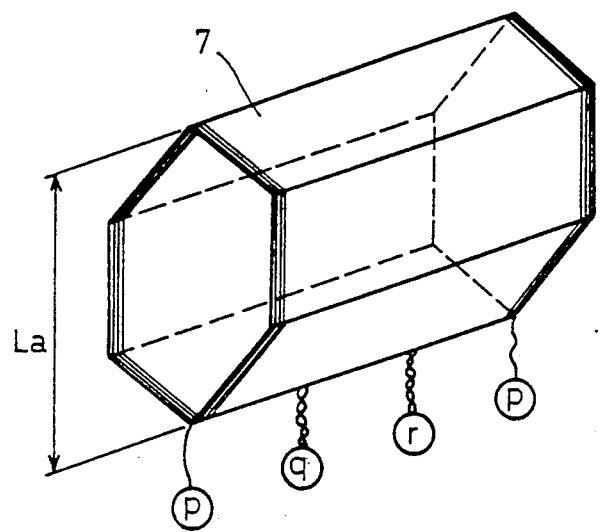
FIG. 12 is a perspective view of coil windings in the conventional coreless motor.
Figure 13:
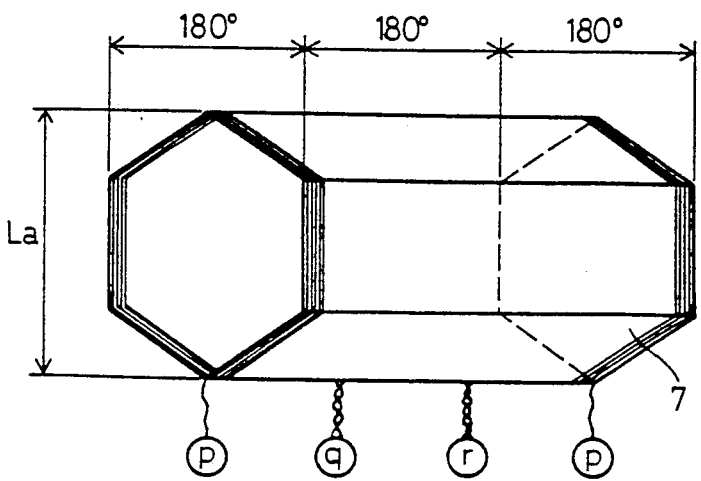
FIG. 13 is a plan view of coil windings of the conventional coreless motor in the flat form.

FIG. 9 is a coil arrangement diagram of the second embodiment according to the invention. A first coil block 91 is wound in a hexagonal shape, starting from a winding start node $A_1$. The coil is wound spirally in the rightward direction sequentially when viewed from a front side of the figure. A front coil 89a and a rear coil 89c are disposed oppositely with each other between the winding start node $A_1$ and the intermediate tap p. Next, a front coil 81a and a rear coil 81c are arranged in opposed relation to each other between the intermediate tap p and the winding end node $A_2$. A coil pitch of the hexagonal shape, i.e., a pitch interval between the winding start node $A_1$ and the intermediate tap p is set to 72 degrees in terms of the mechanical angle. Further, another pitch interval between the intermediate tap p and the winding end node $A_2$ is also set to 72 degrees in terms of the mechanical angle. A closed circuit composed of a single loop of the spirally wound coil has a coil pitch interval of 180 degrees which is substantially identical to a pitch interval of magnetic poles of the magnet 4 (in this embodiment, the magnet has two poles). A mechanical angle is set to 180 degrees between the side line of the first coil 89a of the coil block 91 and the side line of the rear coil 89c. The mechanical angle of 180 degrees corresponds to a whole nodal pitch; however, this angle may be set more than or less than 180 degrees according to a design variation. The coil block 91 has an entire pitch interval of 324 degrees in terms of the mechanical angle.

In a manner similar to the first coil block 91, the second coil block 92 has front coil 82a and a rear coil 82c opposed to each other between the winding start node $B_1$ and the intermediate tap q. Next, another front coil 83a and rear coil 83c are opposed to each other between the intermediate tap q and the winding end node $B_2$. The mechanical angle of the coil block 92 between the side edge lines is set the same as in the coil block 91. The coil block 92 is shifted or displaced from the coil block 91 by 72 degrees in terms of the mechanical angle.

In a manner similar to the first coil block 91, the third coil block 93 has front coil 84a and rear coil 84c opposed to each other between the winding start node $C_1$ and the intermediate tap r. Next, another front coil 85a and rear coil 85c are opposed to each other and arranged between the intermediate tap r and the winding end node $C_2$. The mechanical angle of the coil block 93 between the side edge lines is set the same as in the first coil block 91. The third coil block 93 is displaced from the first coil block 91 by 144 degrees in terms of the mechanical angle.

The fourth coil block 94 has a front coil 86a and rear coil 86c opposed to each other and arranged between the winding start node $D_1$ and the intermediate tap s, in a manner similar to the first coil block 91. Further, another front coil 87a and rear coil 87c are opposed to each other and arranged between the intermediate tap s and the winding end node $D_2$. The mechanical angle of the fourth coil block 94 between the separate side edge lines is set the same as in the first coil block 91. The coil block 94 is displaced from the reference coil block 91 by 216 degrees in terms of the mechanical angle.

The fifth coil block 95 has front coil 88a and rear coil 88c opposed to each other and arranged between the winding start node $E_1$ and the intermediate tap t. Further, another front coil 90a and rear coil 90c face with each other between the intermediate tap t and the winding end node $E_2$. The mechanical angle of the coil block 95 between the separate side edge lines is set the same as in the first coil block 91. The coil block 95 is displaced relative to the first coil block 91 by 288 degrees in terms of the mechanical angle.

Figure 7:
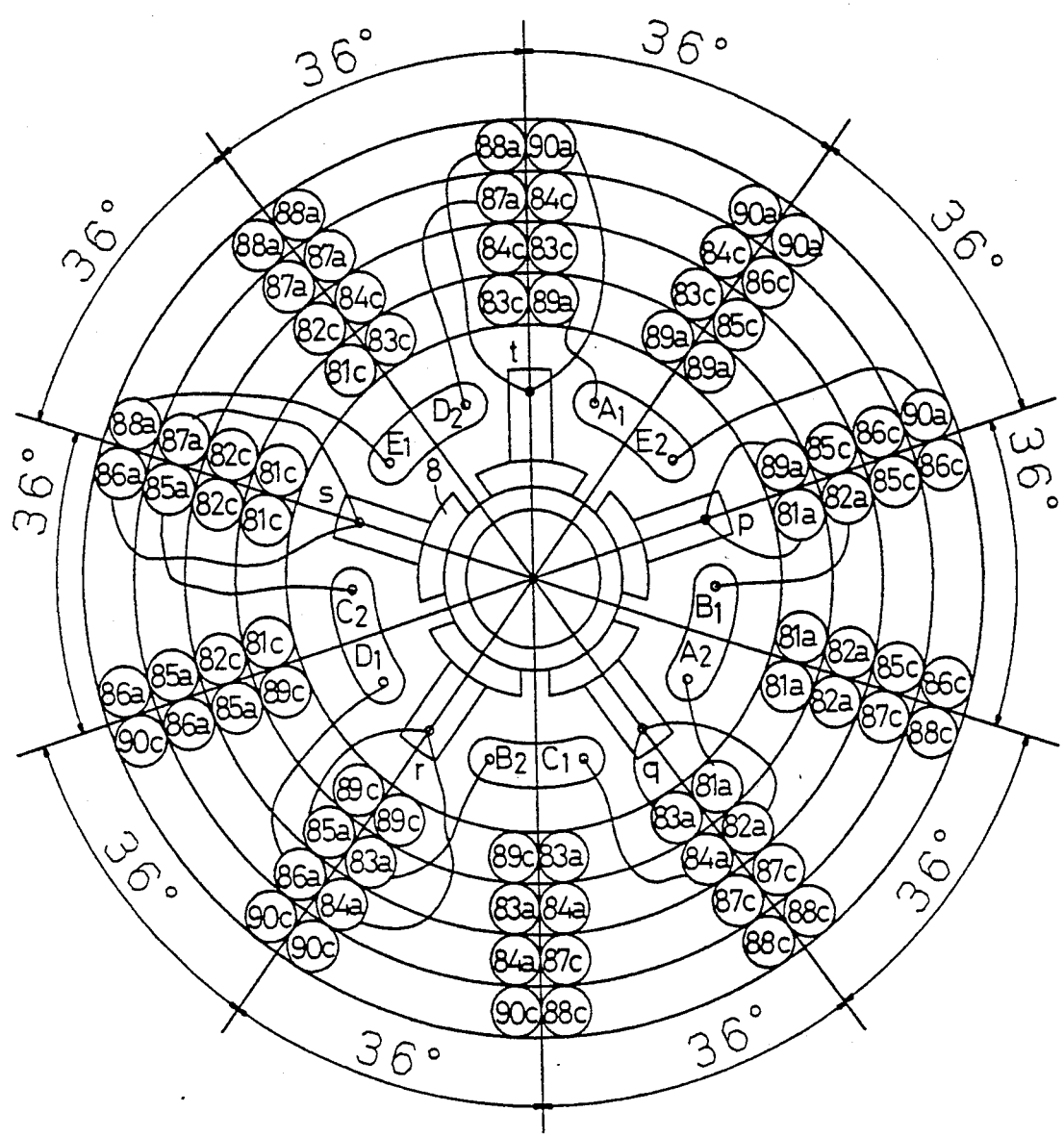
FIG. 7 is a connection diagram of the second embodiment of the coreless motor according to the invention.

FIG. 7 is a pattern diagram showing the electrical connection among the coils 81-90, the junction nodes or pads $A_1/E_2$, $B_1/A_2$, $C_1/B_2$, $D_1/C_2$ and $E_1/D_2$, and the taps or terminals p, q, r, s, and t of the commutator segments 8. In this embodiment, the coils 81-90 are laminated with one another in four layers all around a circle.

As described above, the inventive coreless motor has n number of coil blocks. The M-th coil block has a shift angle $X_M$ as follows:

In the case of the first embodiment where the phase number is set to n=3, $$X_1 = 360/n = 120°$$

$$X_2 = 360 \times 2/n = 240°$$

In the case of the second embodiment where the phase number is set to n=5, $$X_1 = 360/n = 72°$$

$$X_2 = 360 \times 2/n = 144°$$

$$X_3 = 360 \times 3/n = 216°$$

$$X_4 = 360 \times 4/n = 288°$$

Accordingly, the shift angle $X_M$ of the M-th coil block is represented generally by $X_M = 360 \times M/n$ degrees, where M denotes a positive integer from "1" to "n−1", n denotes an odd number having a value of "3" or more. Further, each coil shares a center angle or an angular interval of $(X_2 + 360/P)$ degrees, where P denotes a pole number of the magnet. As a result, in case of the first embodiment, wherein $X_2$ equals 240 degrees, each coil block shares a center angle of $240 + 360/2$ equals 420 degrees (FIG. 5). Furthermore, in case of the second embodiment, wherein $X_2$ equals 144 degrees, each coil block shares a center angle of $144 + 360/2$ equals 324 degrees (FIG. 9).

As described above, according to the invention, the coreless motor has an odd number of coil blocks superposed with one another at a predetermined shift angle, thereby achieving the following effects:

(1) The coreless motor can produce a high output torque through a series connection of coils.
(2) There can be a reduced number of junction nodes as compared to the motor utilizing a parallel connection.

What is claimed is:

1. A coreless motor comprising:
   a permanent magnet integrated with a casing;
   a commutator; and
   a rotor coil unit integrated with an output shaft, the rotor coil unit being comprised of an integral number of rotor coil blocks superposed with one another, each coil block sharing a center angle of degrees, respective ones of the coil blocks having a displacement angle of $X_M = 360 \times M/n$ degrees relative to a reference one of the coil blocks where M denotes a positive integer from "1" to "n−1", n denotes an odd integer having a value of "3" or more, and P denotes a number of poles of the permanent magnet, and wherein the coil blocks are connected in series so as to form respective phases of the rotor coil blocks such that the rotor coil blocks of each phase can pass an electric current in a same direction.

2. A coreless motor according to claim 1; wherein the permanent magnet has two poles.

3. A coreless motor, comprising: a stator comprised of a permanent magnet having a plurality of poles; and a rotor coil unit having an output shaft and mounted to undergo rotation relative to the stator, the rotor coil unit comprising a plurality of coil blocks superposed with one another such that respective ones of the coil blocks have a shift angle relative to a reference one of the coil blocks of $X_M = 360 \times M/n$ and such that each coil block shares a center angle of $X_2 + 360/P$ degrees, wherein $X_M$ is a value in degrees and denotes a shift angle relative to the reference coil block, n is an integer value of 3 or more and denotes the number of coil blocks, M is a positive integer between 1 and n−1 and denotes the Mth coil block relative to the reference coil block, and P denotes the number of poles of the permanent magnet.

4. A coreless according to claim 3; including means electrically connecting coils of the coil blocks in series.

5. A coreless motor according to claim 4; wherein the coil blocks are arranged so that electric current flows in the same direction through the coils of all the coil blocks to produce magnetic fields in the same direction which coact with a magnetic field produced by the permanent magnet to effect rotation of the output shaft.

6. A coreless motor according to claim 3; wherein the coil blocks are arranged so that electric current flows in the same direction through the coils of all the coil blocks to produce magnetic fields in the same direction which coact with a magnetic field produced by the permanent magnet to effect rotation of the output shaft.

7. A coreless motor according to claim 3; wherein the number of coil blocks n is 3, such that a second one of the coil blocks relative to the reference coil block has a shift angle relative to the reference coil block of $X_2 = 360 \times \frac{2}{3} = 240$ degrees.

8. A coreless motor according to claim 7; wherein the number of poles is 2, such that each coil block shares a center angle of $240 + 360/2 = 420$ degrees.

9. A coreless motor according to claim 3; wherein the number of coil blocks n is 5, such that a second one of the coil blocks relative to the reference coil block has a shift angle relative to the reference coil block of $X_2 = 360 \times 2/5 = 144$ degrees.

10. A coreless motor according to claim 9; wherein the number of poles is 2, such that each coil block shares a center angle of $144 + 360/2 = 324$ degrees.

* * * * *